(12) United States Patent  (10) Patent No.: US 9,085,207 B1
Sweet  (45) Date of Patent: Jul. 21, 2015

(54) TOW HITCH RIGGING ARM

(71) Applicant: Joseph J. Sweet, Doerun, GA (US)

(72) Inventor: Joseph J. Sweet, Doerun, GA (US)

( * ) Notice: Subject to any disclaimer, the term of this patent is extended or adjusted under 35 U.S.C. 154(b) by 0 days.

(21) Appl. No.: 14/103,120

(22) Filed: Dec. 11, 2013

Related U.S. Application Data

(60) Provisional application No. 61/890,518, filed on Oct. 14, 2013.

(51) Int. Cl.
  *B60R 9/06* (2006.01)
  *B60D 1/24* (2006.01)
  *B65F 1/14* (2006.01)

(52) U.S. Cl.
  CPC ... *B60D 1/24* (2013.01); *B60R 9/06* (2013.01); *B65F 1/1468* (2013.01); *B65F 1/1473* (2013.01)

(58) Field of Classification Search
  CPC ........ B60R 9/06; B65F 1/1468; B65F 1/1473
  USPC ......... 224/555, 495, 501, 518–521, 523, 530, 224/532, 536, 537; 414/462; 280/480
  See application file for complete search history.

(56) References Cited

U.S. PATENT DOCUMENTS

| 5,282,555 | A | * | 2/1994 | Muir et al. | 224/532 |
|---|---|---|---|---|---|
| 5,850,959 | A | * | 12/1998 | Miller | 224/535 |
| 5,961,272 | A | | 10/1999 | Short | |
| 6,164,896 | A | * | 12/2000 | Cummins | 414/462 |
| 6,203,032 | B1 | | 3/2001 | Ramos | |
| 6,361,264 | B1 | | 3/2002 | Guthrie et al. | |
| 6,698,995 | B1 | * | 3/2004 | Bik et al. | 414/462 |
| D507,688 | S | * | 7/2005 | Jean | D34/10 |
| 7,101,142 | B2 | | 9/2006 | Bik et al. | |
| 7,217,078 | B2 | | 5/2007 | Short | |
| 7,614,637 | B1 | | 11/2009 | Kidd | |
| 8,128,115 | B2 | | 3/2012 | Byrd | |
| 8,162,192 | B1 | * | 4/2012 | Sanchez | 224/521 |
| 2004/0164517 | A1 | * | 8/2004 | Lewy et al. | 280/493 |
| 2004/0219003 | A1 | * | 11/2004 | Bik et al. | 414/462 |
| 2004/0232184 | A1 | * | 11/2004 | Moen et al. | 224/510 |
| 2005/0023796 | A1 | | 2/2005 | Rasmussen | |
| 2005/0161906 | A1 | * | 7/2005 | Thelen | 280/504 |
| 2006/0062658 | A1 | * | 3/2006 | Short | 414/486 |
| 2006/0291985 | A1 | | 12/2006 | Sullivan | |
| 2007/0080181 | A1 | * | 4/2007 | Lynch | 223/85 |
| 2007/0170218 | A1 | * | 7/2007 | Robb | 224/519 |
| 2007/0221695 | A1 | * | 9/2007 | Winkler | 224/519 |
| 2008/0101899 | A1 | * | 5/2008 | Slonecker | 414/462 |
| 2009/0028679 | A1 | * | 1/2009 | Smith | 414/462 |
| 2009/0283987 | A1 | | 11/2009 | Long et al. | |
| 2011/0095061 | A1 | * | 4/2011 | Tortumlu | 224/555 |
| 2012/0325876 | A1 | * | 12/2012 | Hill | 224/401 |
| 2013/0140794 | A1 | * | 6/2013 | Bohse | 280/507 |

* cited by examiner

*Primary Examiner* — Brian D Nash
*Assistant Examiner* — Corey Skurdal
(74) *Attorney, Agent, or Firm* — Robert C. Montgomery; Montgomery Patent & Design, LP

(57) ABSTRACT

A rigging arm device includes an elongated bar assembly having a proximate end, and a distal end, a receiving assembly adapted to be removably affixed to the trailer hitch of a motor vehicle and to receive and retain the proximate end of the bar assembly, and a hook assembly operatively affixed to said distal end of said bar assembly. The, hook assembly selectively engages and retains a refuse container for transport and further includes a latch assembly to unlock and lock the hook assembly to the handles of the refuse container.

15 Claims, 4 Drawing Sheets

TOW HITCH RIGGING ARM

RELATED APPLICATIONS

The present invention was first described in and claims the benefit of U.S. Provisional Application No. 61/890,518, filed Oct. 14, 2013, the entire disclosures of which are incorporated herein by reference.

FIELD OF THE INVENTION

The present invention relates generally to a rigging arm adapted to removably affix to a trailer hitch of a vehicle and having a hook assembly adapted to engage and retain a handle of a refuse container for transport of the container.

BACKGROUND OF THE INVENTION

One (1) of the many chores that plague our everyday lives is the taking out of trash from wastebaskets and other sources commonly found in the American household. Although not time consuming and simple in routine, the job is often burdened by simple problems. Many of us place our trash inside of large trash cans with attached hinged lids. These cans are typically provided by local municipalities or recycling centers, and are used with trucks that automatically pick up the trash cans with a large swing arm. However, these receptacles must be moved to curbside locations for pickup. Those with long and/or inclined driveways or paths often find the moving of such receptacles time consuming or difficult. Those who are elderly or disabled may find such a task impossible. Accordingly, there exists a need for a means by which large wheeled trash cans may be easily moved about over long distances.

SUMMARY OF THE INVENTION

The disadvantages of the prior art are overcome by the present invention in providing a rigging arm device that includes an elongated bar assembly having a proximate end, and a distal end, a receiving assembly adapted to be removably affixed to the trailer hitch of a motor vehicle and to receive and retain the proximate end of the bar assembly, and a hook assembly operatively affixed to said distal end of said bar assembly. The, hook assembly selectively engages and retains a refuse container for transport and further includes a latch assembly to unlock and lock the hook assembly to the handles of the refuse container. In this manner, the use of the present invention allows for true hands-free opening of a large trash can that is quick, easy, and effective.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
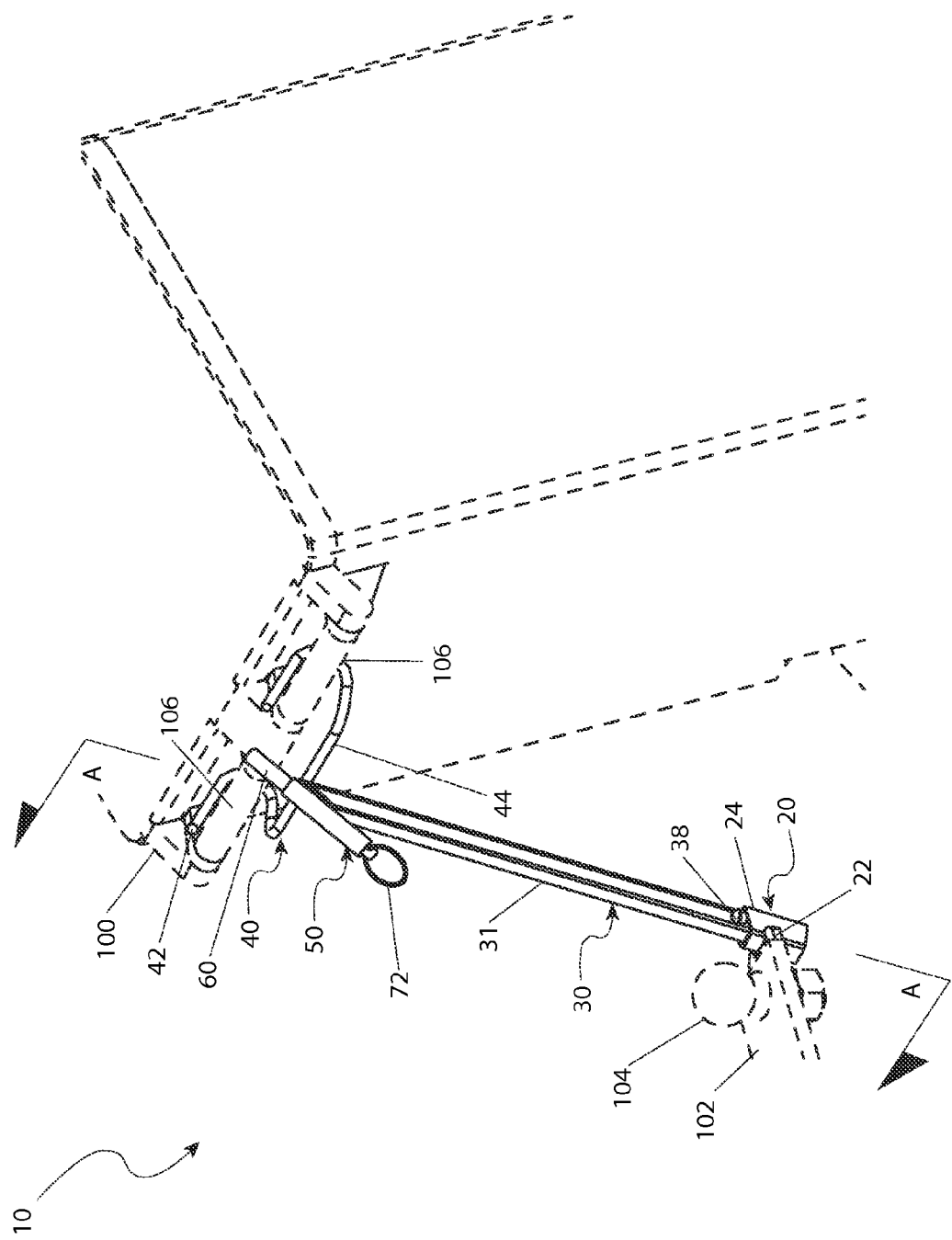
FIG. 1 is an isometric view of a tow hitch rigging arm 10 in accordance with the preferred embodiment of the present invention.
Figure 2:
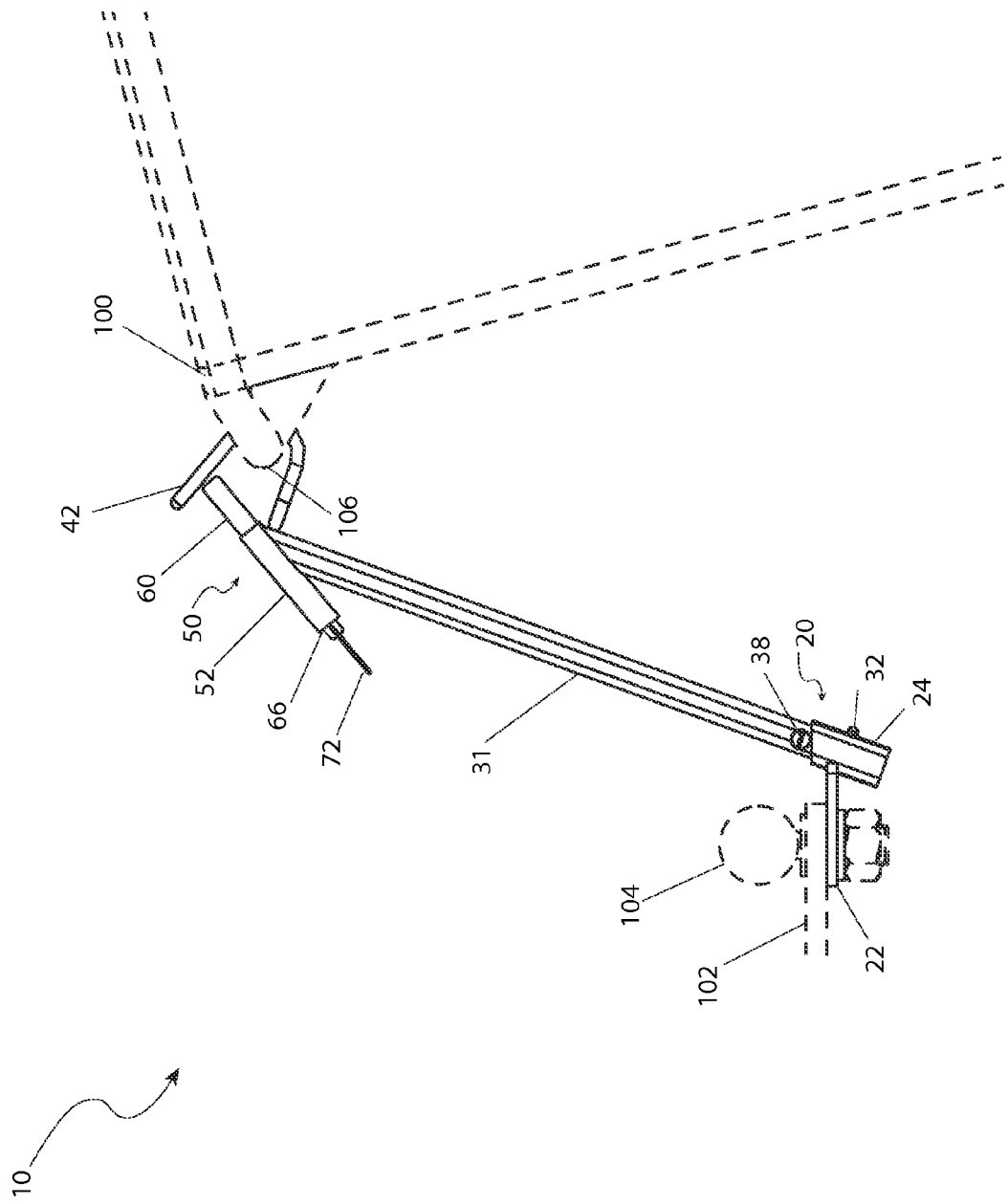
FIG. 2 is a side elevation view of the tow hitch rigging arm 10 in accordance with the preferred embodiment of the present invention.

DESCRIPTIVE KEY 10 tow hitch rigging arm
20 receiver assembly
22 hitch plate
23 hitch plate aperture
24 receiver tube
26 receiver tube aperture
28 receiver tube block
30 bar assembly
31 bar
32 pin
34 pin aperture
36 pin spring
38 spring retainer
40 hook assembly
42 attachment hook
44 yoke
50 latch assembly
52 latch tube
54 tube block
60 latch pin
62 turned diameter
64 shoulder
66 ring aperture
68 spring
72 pull ring
100 refuse container
102 tongue
104 hitch ball
106 container handle

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope. The terms "a" and "an" herein do not denote a limitation of quantity, but rather denote the presence of at least one of the referenced items.

The present invention describes a tow hitch rigging arm (herein referred to as the "apparatus") 10, which provides a means to attach a user's wheeled refuse container 100 to a hitch drawbar 104 on a user's vehicle with a bar assembly 30 having a hook assembly 40 and a movable latch assembly 50. The terms "front" and "back" or "rear" are used in reference to the position of the refuse container 100 as being the back/rear of the apparatus 10.

Referring now to FIG. 1, an isometric view of the apparatus 10 according to the preferred embodiment of the present invention, is disclosed. The apparatus 10 is comprised of a receiver assembly 20, a bar assembly 30, a hook assembly 40, and a latch assembly. The bar assembly 30 is comprised preferably of a square tubular steel bar 31 provided with a protective coating, or plating, to inhibit corrosion. The bar 31 may have a cross-sectional shape other than a square tube, such as a round pipe, without limiting the scope of the apparatus 10. The length of the bar 31 may vary in other embodiments in order to accommodate the attachment to other towing vehicles without limiting the scope of the apparatus 10.

Figure 4:
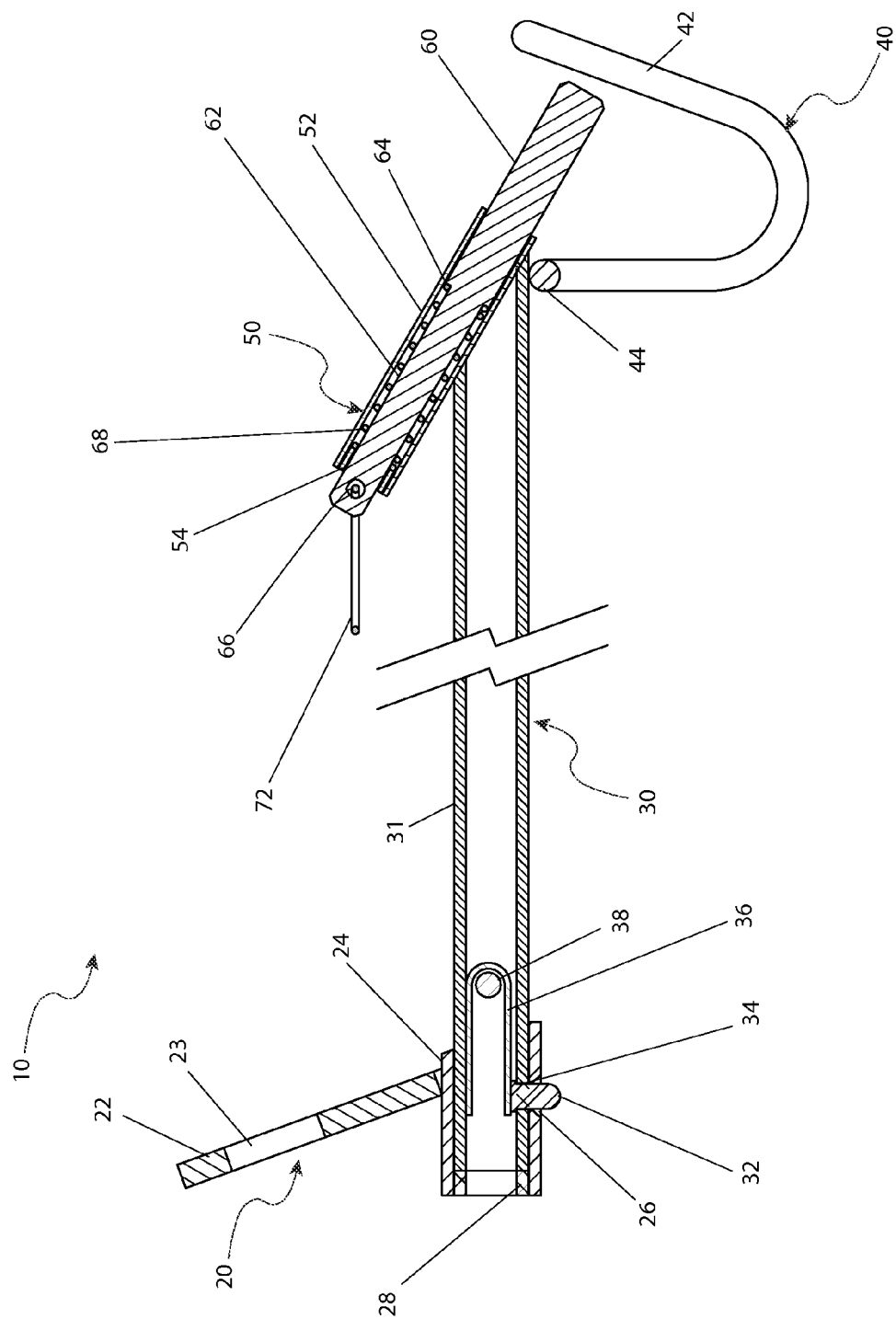

The receiver assembly 20 is preferably comprised of a receiver tube 24 welded to a flat steel hitch plate 22. The receiver tube 24 is comprised of a length of tubular steel having a similar, albeit larger, cross-section to the bar 31 such that the bar 31 may be accommodated within the receiver tube 24 with a sliding fit tolerance. A receiver tube block 28, comprised preferably of a short length of tubular steel having a cross-sectional size and shape to fit within the receiver tube 24, is welded at a lower end of the receiver tube 24 to block the passage and further downward travel of the bar 31 as seen in FIG. 4. A receiver tube aperture 26 is disposed in a wall of the receiver tube 24 to accommodate a pin 32 located within the bar 31 which will lock the bar 31 into the receiver tube 24 when engaged. The longitudinal axis of the receiver tube 24 is oriented at an angle to the surface of the hitch plate 22. The illustration of the preferred embodiment depicts the upper end of the receiver tube 24 as being cut at some angle other than square to the longitudinal axis. This is not a defining point of the apparatus 10 and it is understood that any disposition with a horizontal plane should not be considered as a limitation to the scope of the apparatus 10. Disposed in the hitch plate 22 is a hitch plate aperture 23, as seen in FIG. 4, for the purpose of attaching the hitch plate 22 to a tongue 102, or similar provision on a user's tow vehicle, with a through bolt, such as the threaded shank of a hitch ball 104.

Referring now to FIG. 4, a section view along line A-A as shown in FIG. 1 of the apparatus 10, according to the preferred embodiment of the present invention, is disclosed. The internal components and features of the bar assembly 30 of the apparatus 10 are more clearly shown and detailed within this illustration. Disposed in a lower end of the bar 31 is a pin aperture 34 through which the pin 32 protrudes. The pin 32 is held in position within the pin aperture 34 by a pin spring 36. The pin spring 36 is preferably a "U"-shaped spring which is compressed between an inner surface of the pin 32 and the back wall of the bar 31 tube. The pin spring 36 may alternately be comprised of a coil spring having one (1) or more coils and torsion arms which hold the pin 32 within the pin aperture 34 until the pin 32 is displaced manually. In any case the pin spring 36 is held in the proper location by a spring retainer 38. The spring retainer 38 is preferably a threaded fastener which passes through an over-sized aperture (not shown) in a tube wall of the bar 31 and is secured in a threaded aperture on an opposite tube wall while passing through and securing the pin spring 36 in a proper location within the bar 31. The spring retainer 38 could also be comprised of any other retaining device, such as a tapered steel pin wedged into tapered apertures in opposing tube walls of the bar 31, without limiting the scope of the apparatus 10.

The hook assembly 40 comprises a yoke 44 and a pair of attachment hooks 42. In the preferred embodiment, the hook assembly 40 is formed from a round steel rod. The yoke 44 portion of the hook assembly 40 is attached at its midpoint near the upper end of the tube 31 such that two distal ends extend horizontally and laterally outward, perpendicular to the bar assembly 30. Each of the two distal ends of the yoke 44 are formed into "U"-shaped, upwardly turned attachment hooks 42. The hook assembly 40 is preferably provided with a protective coating, or plating, to inhibit corrosion. Other materials and/or shapes can be used for the fabrication of the hook assembly without limiting the scope of the apparatus 10. The yoke 44 of the hook assembly 40 is of sufficient length to space the attachment hooks 42 to receive the handles 106 of a common refuse container 100 and maintain the stability of the refuse container 100 during transportation. As the attachment hooks 42 engage the refuse container handles 106, the orientation of the open ends of the attachment hooks 42 cause them to be turned forward away from the refuse container 100 such that the container handles 106, and thus the refuse container 100, will be towed by the apparatus 10.

The latch assembly 50 is comprised preferably of a round tubular steel latch tube 52, a cylindrical latch pin 60, latch tube block 54, and a pull ring 72. The latch assembly 50 is disposed at the end of the bar 31 opposite the receiver assembly 20. More specifically, as indicated in the figures, when the bar 31 is operatively inserted downward into the open end of the receiver tube 24, the latch assembly 50 is affixed to the upper end of the bar 31 such that it is set at an upwardly inclined angle from the perpendicular of the bar 31. In the preferred embodiment of the present invention, the longitudinal axis of the latch assembly 50 is oriented upwardly from a horizontal plane at an approximate angle of forty degrees (40°) which allows a sufficient clearance with any portion of the refuse container 100. Additionally, the longitudinal axis of the latch assembly 50 is set parallel to the intended vehicular path of travel. In the preferred embodiment, the latch tube 52 is welded to the upper end of the bar 31 and is further provided with a protective coating, or plating to resist corrosion. The end of the bar 31 may be provided with a concave surface to increase the contact area between the latch tube 52 and the bar 31 for improved weld penetration.

The latch pin 60 is comprised preferably of a commercial aluminum alloy round bar with a diameter of a size to fit within the latch tube 52 with a sliding fit tolerance. One (1) end of the latch pin 60 is provided with a turned diameter 62 along some part of the length being somewhat smaller than the original diameter. This turned diameter 62, as can be seen in FIG. 4, is formed to accommodate the insertion of that end of the latch pin 60 through a coiled compression spring 68. The shoulder 64 is the step between the turned diameter 62 and the original diameter of the latch pin 60. The spring 68 is positioned in all configurations of the apparatus 10 to have one (1) end in contact with the shoulder 64 of the latch pin 60. In this manner, the spring 68 causes the latch pin 60 to extend from the latch tube 52 to a locked position (see FIG. 1). A ring aperture 66 is disposed near the end of latch pin 60 in the turned diameter 62 to accept and retain the pull ring 72. The pull ring 72 allows the user to move the latch pin 60 to an unlocked position and limits its range of motion within the latch tube 52. It is understood that the latch pin 60 may be provided with any machining reliefs or chamfers as deemed necessary without limiting the scope of the apparatus 10.

A latch tube block 54, comprised preferably of a short length of round tubular steel having an outside diameter sized to fit within the latch tube 52 and an inside diameter sized to accommodate the turned diameter 62 with a sliding fit tolerance, is welded at the front end of the latch tube 60 as can be seen in FIG. 4. The purpose of this latch tube block 54 is to form an opposing surface to the shoulder 64 of the latch pin 60 and trap the compression spring 68 thereby presenting two (2) working surfaces upon which the spring 68 can act to keep the latch assembly 50 closed. The pull ring 72 is comprised of a formed loop of metal, or other suitable material, inserted into the ring aperture 66 to serve the dual purposes of containing the latch pin 60 within the latch tube 52 and providing a gripping structure for the user to retract the exposed end of the latch pin 60 into the rear of the latch tube 52, thereby opening the latch assembly 50 as can be seen in FIG. 3.

Figure 3:
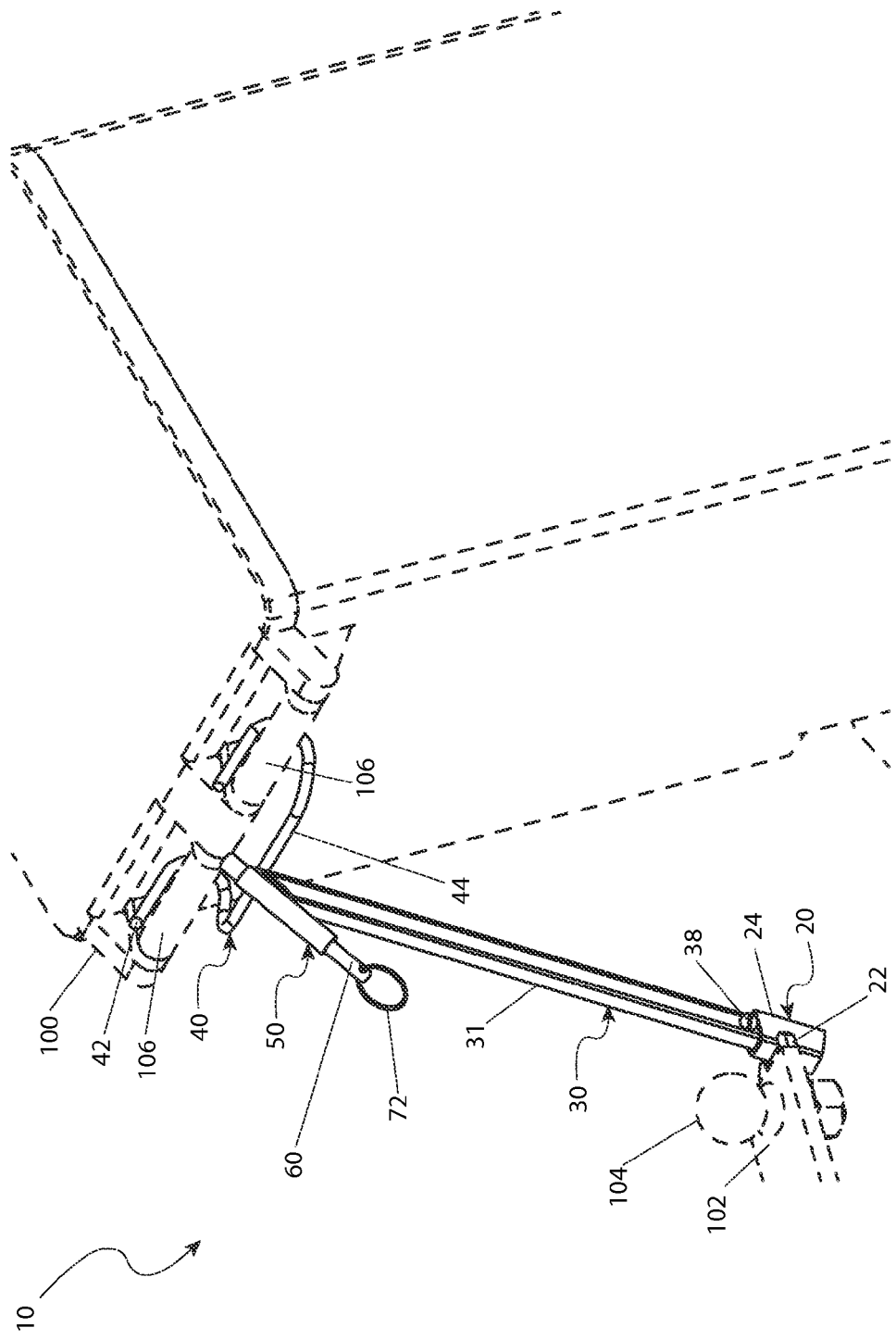
FIG. 3 is an isometric view of the tow hitch rigging arm 10 depicted with a latch pin 60 in an open position in accordance with the preferred embodiment of the present invention; and, FIG. 4 is a section view along a line A-A as shown on FIG. 1 of the tow hitch rigging arm 10 in accordance with the preferred embodiment of the present invention.

In operation, when the pull ring 72 is pulled away from the hook assembly 40 such that the large diameter of the latch pin 60 is drawn into the latch tube 52 and the captured spring 68 is further compressed as seen in FIG. 3; all impediments to engaging the attachment hooks 42 into the handles of the refuse container 100 are removed, and the refuse container 100 can be tilted and placed in the apparatus. When the pull ring 72 is released, as shown in FIG. 1, the spring 68 expands to force the latch pin 60 to extend from the front of the latch tube 52 to block the removal of the attachment hooks 42 from the handles 106 of the refuse container 100.

The preferred embodiment of the present invention can be utilized in a simple and straightforward manner with little or no training. After initial purchase or acquisition of the apparatus 10, it would be installed as indicated in FIG. 1. The method of installing and utilizing the apparatus 10 may be achieved by performing the following steps: acquiring a model of the apparatus 10 having the proper overall length and appropriate hitch adapter to match the user's towing vehicle; installing the receiver assembly 20 on the tongue 102, or other attachment point, of the user's towing vehicle preferably by means of inserting a threaded fastener, such as a hitch ball 104, through the hitch plate aperture 23; inserting the bar assembly 30 into the receiver assembly 20 until the pin 32 fits through the receiver tube aperture 26 and locks the bar 31 into the correct position; parking user's towing vehicle in proximity to the refuse container 100; pulling the pull ring 72 on the latch pin 60 away from the hook assembly 40 to retract the latch pin 60 into the latch tube 52 thus permitting access to the attachment hooks 42; tilting the refuse container 100 and engaging the attachment hooks 42 into the handles of the refuse container 100; releasing the pull ring 72 so as to allow the latch pin 60 to return to the "closed" position thereby preventing the attachment hooks 42 from becoming disengaged from the handle of the refuse container 100; towing the refuse container 100 to the desired location; pulling the pull ring 72 away from the hook assembly 40 to retract the latch pin 60 into the latch tube 52 thus allowing sufficient clearance to disengage the handle of the refuse container 100 from the attachment hooks 42; returning the refuse container 100 to the full upright position; removing the bar assembly 30 from the receiver assembly 20 by pushing in on the pin 32 to permit the pin 32 to disengage from the receiver tube aperture 26; storing the bar assembly 30 in a convenient location until the refuse container 100 again needs to be relocated.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A tow hitch rigging arm, comprising:
    a bar assembly having a proximate end and a distal end;
    a receiver assembly operatively affixed to a trailer hitch assembly of a vehicle and to said proximate end of said bar assembly; and,
    a hook assembly operatively affixed to said distal end of said bar assembly comprising a latch assembly, said latch assembly comprised of:
        a latch tube affixed at said distal end of said bar assembly;
        a latch pin disposed slidingly within said latch tube;
        a latch pin spring disposed within said latch tube about said latch pin and adapted to bias said latch pin to extend outwardly from said latch tube to a locked position; and,
        a pull ring affixed to a distal end of said latch pin to provide a user with a means to retract said latch pin from said locked position and limit the range of motion of said latch pin caused by said spring;
    wherein said hook assembly selectively engages and retains a refuse container for transport.

2. The rigging arm of claim 1, said receiver assembly comprising:
    a receiver tube, wherein said tube is adapted to receive and retain said bar assembly;
    a hitch plate having a hitch plate aperture;
    wherein said hitch plate is affixed to said receiver tube; and,
    wherein said hitch plate is selectively affixed to said trailer hitch assembly by said hitch plate aperture.

3. The rigging arm of claim 2, said receiver assembly further comprising:
    a receiver tube aperture; and,
    a receiver tube block disposed within said receiver tube;
    wherein said proximate end of said bar assembly is disposed within said receiver tube and seated against said tube block.

4. The rigging arm of claim 3, said bar assembly further comprising:
    a pin aperture; a pin adapted to protrude through said pin aperture; and a pin spring operative to exert pressure to cause said pin to protrude through said aperture;
    wherein said pin is selectively received and engaged by said receiver tube aperture to retain said bar assembly in said receiver tube.

5. The rigging arm of claim 1, said hook assembly comprising;
    a yoke affixed to said bar assembly and extending laterally outward and perpendicular from said bar assembly to a distal end; and,
    an attachment hook affixed to said distal end of said yoke such that an open end of said hook is upwardly turned to receive a handle of said refuse container.

6. The rigging arm of claim 5, wherein said yoke of said hook assembly further comprises:
    two of said distal ends, each of said two distal ends extending oppositely and laterally outward in a perpendicular direction from said bar assembly; and,
    two of said attachment hooks;
    wherein each of said two attachment hooks is affixed to each of said distal ends of said yoke; and,
    wherein each of said attachment hooks are upwardly turned to receive said handle of said refuse container.

7. The rigging arm of claim 6, wherein said yoke and attachment hooks of said hook assembly further comprises a singular piece of steel rod operatively shaped to have a central length with two distal ends, wherein each of said distal ends is formed in an upwardly open hook shape.

8. The rigging arm of claim 1, said latch assembly further comprising a tube block disposed within said latch tube;
    wherein said tube block provides a seat for an end of said spring and provides a block to limit the range of motion of said latch pin when pulled to an unlocked position.

9. The rigging arm of claim 1, wherein said latch pin further comprises a pull ring aperture adapted to accept and retain said pull ring;

wherein said pull ring is comprised of a formed loop of metal inserted into said pull ring aperture.

10. A tow hitch rigging arm, comprising:
a bar assembly having a proximate end and a distal end;
a receiver assembly operatively affixed to a trailer hitch assembly of a vehicle and said proximate end of said bar assembly and comprising:
a receiver tube, wherein said tube is adapted to receive and retain said bar assembly;
a hitch plate having a hitch plate aperture;
a hook assembly operatively affixed to said distal end of said bar assembly and comprised of:
a hook for adaptively and selectively engaging and retaining a handle of a refuse container;
a latch tube affixed at said distal end of said bar;
a latch pin disposed slidingly within said latch tube;
a latch pin spring disposed within said latch tube about said latch pin and adapted to bias said latch pin to cause said latch pin to extend outwardly from said latch tube to a locked position; and,
a pull ring affixed to a distal end of said latch pin to provide a user with a means to retract said latch pin from said locked position and limit the range of motion of said latch pin caused by said spring;
wherein said hitch plate is affixed to said receiver tube and wherein said hitch plate is selectively affixed is said trailer hitch assembly by said hitch plate aperture.

11. The rigging arm of claim 10, said bar assembly further comprising:
a pin aperture;
a pin adapted to protrude through said pin aperture; and,
a pin spring operative to exert pressure to cause said pin to protrude through said aperture;
wherein said pin is selectively received and engaged by said receiver tube to retain said bar assembly in said receiver tube.

12. The rigging arm of claim 10, said hook assembly comprising;
a yoke affixed to said bar assembly and extending laterally outward and perpendicular from said bar assembly to a distal end; and,
an attachment hook affixed to said distal end of said yoke such that an open end of said hook is upwardly turned to receive a handle of said refuse container.

13. The rigging arm of claim 12, wherein said yoke of said hook assembly further comprises:
two of said distal ends, each of said two distal ends extending oppositely and laterally outward in a perpendicular direction from said bar assembly; and,
two of said attachment hooks;
wherein each of said two attachment hooks is affixed to each of said distal ends of said yoke; and,
wherein each of said attachment hooks are upwardly turned to receive said handle of said refuse container.

14. The rigging arm of claim 13, wherein said yoke and attachment hooks of said hook assembly further comprises a singular piece of steel rod operatively shaped to have a central length with two distal ends;
wherein each of said distal ends is formed in an upwardly open hook shape.

15. A method of installing and utilizing the trailer rigging arm of the present invention, said method includes the steps of:
i. providing said apparatus, comprising:
a. a bar assembly having a proximate end and a distal end;
b. a receiver assembly adapted to accept and retain said distal end of said bar assembly and be affixed to a trailer hitch of a user's vehicle;
c. a hook assembly affixed to said proximate end of said bar assembly and adapted to engage a refuse container; and,
d. a latch assembly adapted to lock and unlock said hook assembly from said refuse container, having a latch tube affixed at said distal end of said bar assembly, a latch pin disposed slidingly within said latch tube, a latch pin spring disposed within said latch tube about said latch pin and adapted to bias said latch pin to extend outwardly from said latch tube to a locked position, and a pull ring affixed to a distal end of said latch pin;
ii. installing said receiver assembly on said trailer hitch;
iii. inserting said bar assembly into said receiver assembly until said bar assembly locks into position;
iv. moving and parking said user's vehicle in proximity to said refuse container to be transported;
v. moving said pull ring to position said latch pin to an unlocked position to permit access to said hook assembly;
vi. tilting said refuse container and engaging said hook assembly into a handle of said refuse container;
vii. moving said pull ring to position said latch pin to a locked position to retain said handle of said container in said hook assembly;
viii. towing said refuse container to the desired location;
ix. moving said pull ring to position said latch pin to said unlocked position;
x. removing said handle from said hook assembly;
xi. returning said refuse container to a full upright position; and,
xii. removing said bar assembly from said receiver assembly.

* * * * *